United States Patent
Ryan

[15] 3,688,827
[45] Sept. 5, 1972

[54] FEED WAGON AUGER

[72] Inventor: Kelly P. Ryan, c/o Blair Manufacturing Co., Inc., Blair, Nebr. 68008

[22] Filed: March 8, 1971

[21] Appl. No.: 121,785

[52] U.S. Cl. ............... 146/106, 222/238, 222/412, 259/97
[51] Int. Cl. ..................... A01f 12/40, B02c 18/00
[58] Field of Search ..... 146/106; 259/7, 97; 222/238, 222/240, 241, 412, 413

[56] References Cited

UNITED STATES PATENTS 3,294,133   12/1966   Claas .................... 146/106 X
3,345,042   10/1967   Ryan .......................... 259/7
3,421,740   1/1969    Behrens ................. 259/97 X Primary Examiner—Willie G. Abercrombie
Attorney—Hofgren, Wegner, Allen, Stellman & McCord

[57] ABSTRACT

A feed wagon having a feed box provided with an auger for moving feed therethrough. The auger is mounted on means for maintaining the auger substantially horizontal while permitting vertical displacement thereof. Paddle means are provided on the auger for mixing and slicing the feed.

14 Claims, 6 Drawing Figures

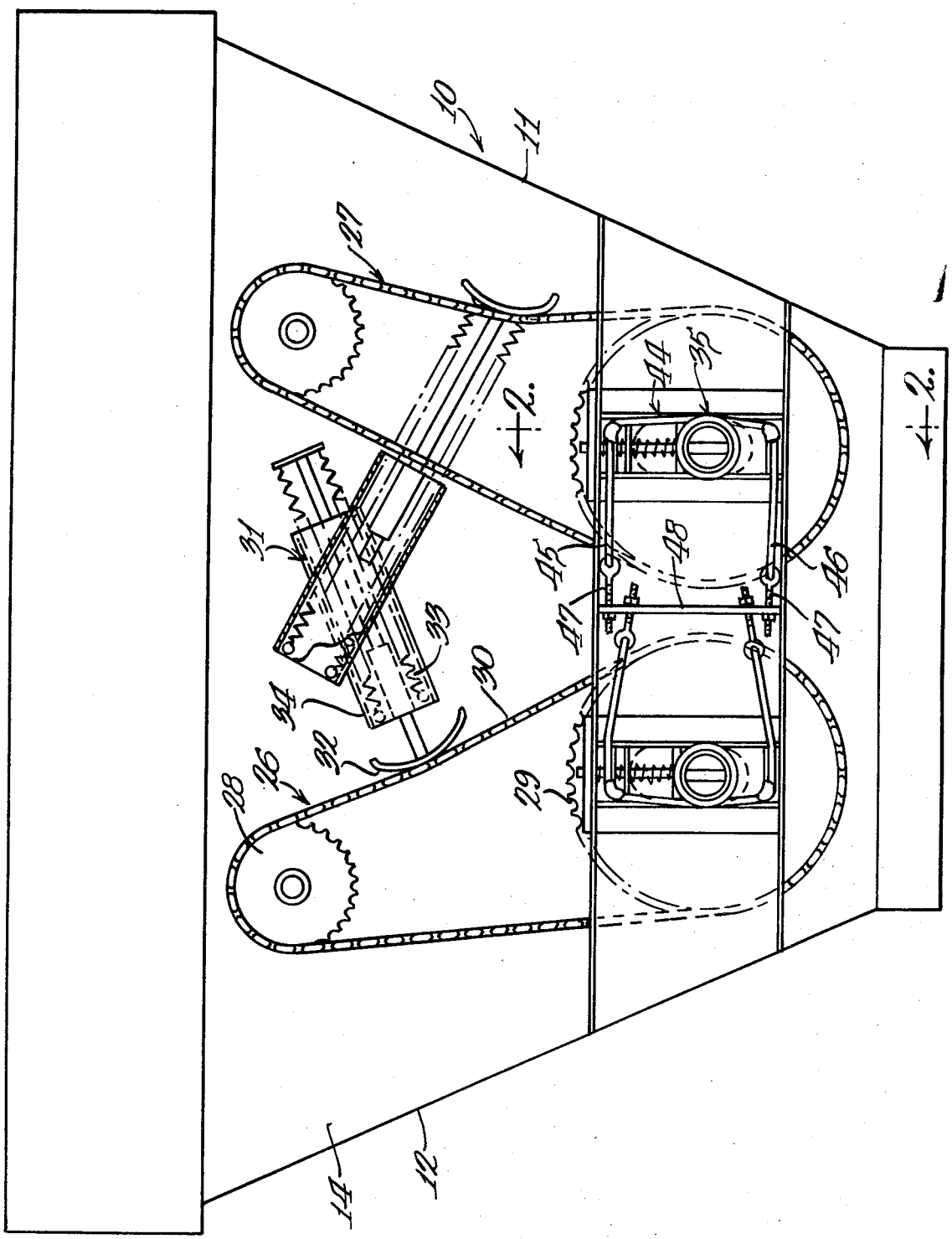

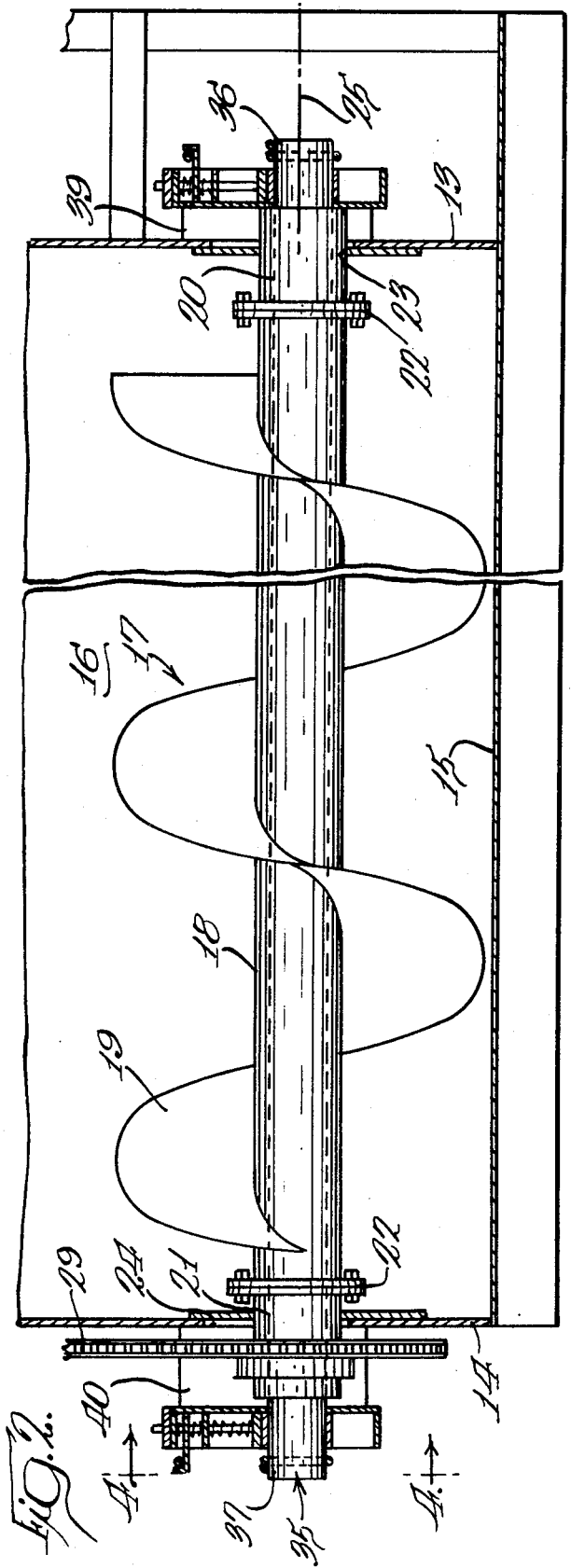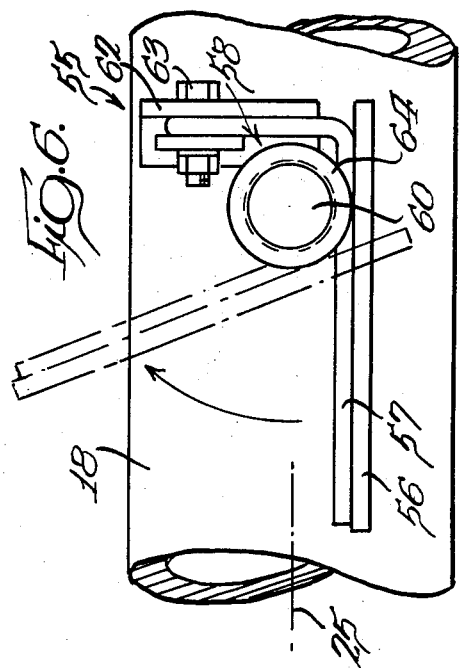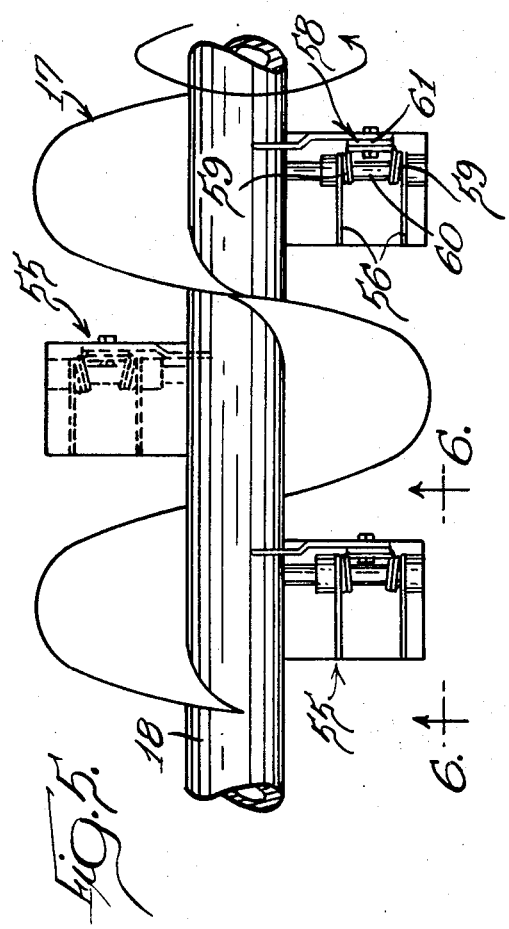

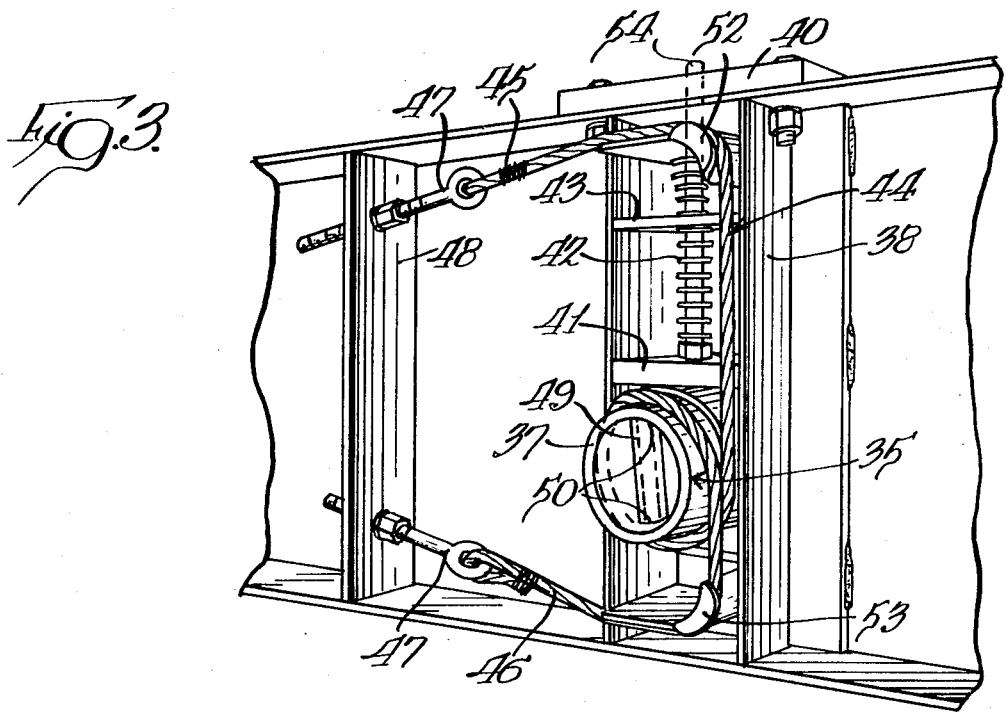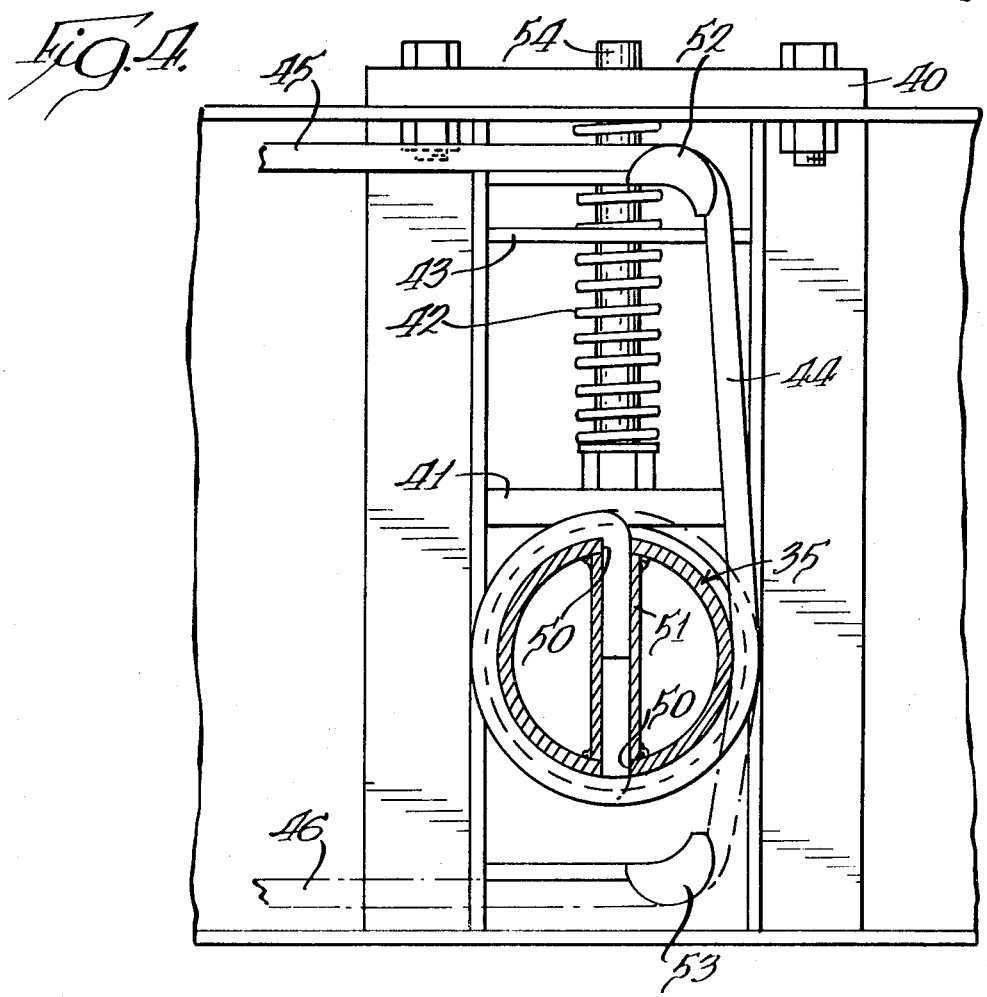

3,688,827

FEED WAGON AUGER

BACKGROUND OF THE INVENTION

1. Field of the Invention

This invention relates to feed wagons and in particular to feed wagons having auger feed moving means.

2. Description of the Prior Art

In one improved transporting and mixing feed wagon as shown in my U.S. Pat. No. 3,345,042 issued Oct. 3, 1967 for "Cattle Feeding Device," a feed wagon is shown having a conveyor in the lower portion of the feed box for moving the feed horizontally through the feed box to an elevating and mixing conveyor.

In another form of conventional feed wagon, the horizontal movement of feed along the bottom wall is effected by means of an auger driven for rotation about a horizontal axis. It has been found in the use of such augers that feed such as fibrous feed becomes compressed between the auger flights and the bottom wall of the auger box portion of the feed box. The compression of the feed therebetween causes a wedging action tending to distort the auger and feed box and in general, reduce the efficiency of the mixing operation.

SUMMARY OF THE INVENTION

The present invention comprehends an improved auger type feed wagon having a floating auger eliminating the disadvantages of the conventional auger feed wagons as discussed above. The floating auger structure is extremely simple and economical of construction while yet providing the highly desirable improved functioning.

The means for mounting the auger in the present invention is arranged to cause the auger to have maintained parallel relationship with the bottom wall of the feed box while permitting the auger to have vertical displacement relative thereto, thereby avoiding the feed compression problem of the prior art structures.

In the illustrated embodiment, a vertical displacement of the auger is controlled by rotation of the auger mounting means. The auger may be biased downwardly to its lowermost position by suitable spring means.

A pivotally mounted paddle may be provided on the auger for improved sliding and mixing of the feed. The paddle may be biased to a position parallel to the axis of the auger and swingable therefrom by the action of the feed thereagainst up to a maximum of approximately 70° from the parallel position to provide improved feed mixing and slicing.

BRIEF DESCRIPTION OF THE DRAWING

Other features and advantages of the invention will be apparent from the following description taken in connection with the accompanying drawing wherein:

FIG. 1 is an end elevation of a feed wagon having an auger means embodying the invention;

FIG. 2 is a fragmentary enlarged vertical section thereof;

FIG. 3 is a fragmentary perspective view of the auger mounting means;

FIG. 4 is a fragmentary enlarged front elevation thereof;

FIG. 5 is a fragmentary elevation of a modified auger construction having spring biased paddle means; and FIG. 6 is a fragmentary enlarged view taken substantially along the line 6—6 of FIG. 5.

DESCRIPTION OF THE PREFERRED EMBODIMENTS

In the exemplary embodiments of the invention as shown in the drawing, a feed wagon structure generally designated 10 is shown to comprise a feed box generally designated 11 having upstanding walls 12 including end walls 13 and 14, and a bottom wall 15 cooperatively defining a feed receiving space 16.

A pair of augers each generally designated 17 extend across the lower portion of space 16 adjacent bottom wall 15 for moving feed in space 16. Each auger 17 includes a shaft 18 and flighting 19. Shaft 18 comprises a tubular shaft and may be provided with tubular end extensions 20 and 21 secured thereto by bolted flanges 22. Shaft extensions 20 and 21 extended freely through vertically enlarged openings 23 and 24 in end walls 13 and 14 respectively, for free rotation of the auger shaft about the axis 25 thereof. Rotation of each auger shaft is effected by suitable means, such as chain drives 26 and 27 as seen in FIG. 1. Thus, each chain drive includes a driver sprocket 28 journalled on end wall 14, a driven sprocket 29 fixed to shaft extension 21, and a chain 30 for driving sprocket 29 from sprocket 28.

Shaft 18 is mounted for movement transaxially of axis 25 to prevent compression of feed and the like between the flighting 19 and bottom wall 15 during normal operation of the auger. Take-up devices 31 are provided for taking up slack in the chains and may include a shoe 32 urged against the chain by a suitable spring 33 in a housing 34. The take-up of chains 30 permits the transaxial movement of the auger shaft while maintaining the driving connection between sprockets 28 and 29. The movable mounting of shaft 18 effectively comprises a floating mounting of the shaft whereby the shaft may be displaced vertically away from and toward bottom wall 15 during the operation of the auger. More specifically, as seen in FIG. 2, shaft 18 is mounted on a through shaft which extends coaxially through the tubular shaft 18 to have end portions 36 and 37 thereof project outwardly beyond end walls 13 and 14 respectively. Shaft 35 may be tubular as seen in FIG. 3 and the end portions thereof may be vertically guided in a guide 38 carried on the end walls 13 and 14 by supports 39 and 40 respectively. The shaft ends are slidable in guide 38 for vertical displacement and for rotation of the shaft 35. The shaft ends may be urged downwardly by a pressure plate 41 biased downwardly by a spring 42 compressed between plate 41 and a fixed plate 43 carried by the guide 38.

Means are provided for causing shaft 35 to rotate as the result of a vertical displacement of the shaft and thereby to cause an equal vertical displacement of each end 36 and 37 of the shaft to maintain the shaft parallel to the bottom wall 15 at all times in the different vertically related positions thereof. More specifically, as best seen in FIG. 3, the shaft is carried by a cable 44 having end portions 45 and 46 secure to turnbuckles 47 connected to a mounting plate 48. The mid-portion of the cable is wrapped around the shaft extension and one portion 49 is passed diametrically through suitable openings 50 in the shaft extension and a diametric tube 51 extending between the openings 50. The cable may be turned about corner guides 52 and 53. Thus, as best seen in FIG. 4, vertical movement of shaft 35 causes the shaft to be rotated on cable 44. This rotation is transmitted directly to the opposite end 36 of the shaft which, in turn, causes a vertical displacement accurately corresponding to the vertical displacement of the first end, thereby maintaining shaft 35 in a plurality of parallel vertically related positions.

Spring 42 may be mounted on a spring retainer 54 which may project upwardly through support 40 and which may be secured to the pressure plate 41 as seen in FIG. 4. Cable 44 is wrapped about the shaft extension outwardly of guide 38 whereby the shaft extension may have sliding contact directly with guide 38 and pressure plate 41.

Thus, in normal operation, the augers are caused to rotate in the normal manner by chain drives 26 and 27. In the event that feed becomes compressed between the flighting 19 and bottom wall 15, at any position along the flighting, the auger may move readily upwardly against the action of spring 42 to prevent jamming of the auger by the compressed feed. The vertical displacement of the auger is transmitted through the shaft extensions 36 and 37 to effect concurrent vertical displacement and rotation of shaft 35 to assure a maintained parallel relationship of the auger with the bottom wall 15. When the compressed feed condition is removed, the auger may move immediately back to the lowermost position. In the illustrated embodiment, springs 42 are provided for biasing the auger downwardly. As will be obvious to those skilled in the art, the auger may be freely mounted for gravitational return to the lowermost position, as desired.

The auger mounting means is extremely simple and economical of construction while yet providing the improved floating mounting of the auger.

Turning now to FIGS. 5 and 6, a paddle structure generally designated 55 is provided on auger 17 for mixing and slicing the feed to maintain the feed in a comminuted condition for facilitated movement thereof by the auger. Each paddle structure 55 includes a paddle blade 56 fixed to an end portion 57 of a wire spring generally designated 58. The wire spring includes, in addition to end portions 56, turned portions 59 mounted on a pin 60 and a bight portion 61 fixed to a bracket 62 by suitable securing means such as nut and bolt means 63. The bracket is suitably secured to auger shaft 18 such as by welding and pin 60 is suitably secured to bracket 62. Blade 56 may be secured to annular bosses 64 journalled on pin 60 for facilitated pivoting of the blade 56 about the axis of the pin against the biasing action of spring 58.

In the illustrated embodiment, spring 58 biases the paddle blade to a position substantially parallel to the axis 25 of shaft 18. During the operation of auger 17, the blade may pivot from the parallel position up to approximately 70° therefrom for slicing and mixing of the feed for improved action with auger flights 19. Thus, the problem of compression of the fibrous feed material between flights 19 and feed box bottom wall 15 is further alleviated by the use of paddle means 55.

As shown in FIG. 5, the paddle means 55 may be mounted intermediate the turns of flighting 19 for improved slicing and mixing action. Paddles 55 are extremely simple and economical of construction while yet providing the improved slicing and mixing functions discussed above.

The foregoing disclosure of specific embodiments is illustrative of the broad inventive concepts comprehended by the invention.

I claim:

1. in a feed wagon having a feed box having upright walls and a bottom wall cooperatively defining a feed holding space, and an auger extending across said space for moving feed through said space, said auger including a shaft and flighting on said shaft within said space, means for rotatively mounting said auger comprising:
   means carried by opposite ones of said upright walls for supporting spaced portions of said auger shaft for concurrent transaxial movement to maintain the shaft at all times in a plurality of substantially parallel positions; and
   means for rotating the shaft about the axis thereof in each of said position.

2. The feed wagon auger mounting means of claim 1 wherein said shaft comprises a tubular shaft and said supporting means comprises a second shaft extending coaxially through said tubular shaft and yieldable mounting means at said opposite upstanding walls for maintaining vertical displacement of each end of said second shaft substantially equal at all times.

3. The feed wagon auger mounting means of claim 2 wherein said yieldable mounting means comprises means responsive to a vertical displacement of said second shaft to rotate said second shaft about its axis whereby each end of said second shaft is caused to be equally rotated and thereby displaced equally vertically.

4. The feed wagon auger mounting means of claim 2 wherein each said yieldable mounting means comprises a cable having fixed opposite ends and a mid-portion wrapped about the end of said second shaft whereby vertical displacement of said second shaft causes a concurrent rotation thereof for causing substantially equal rotation and elevation of each end of said second shaft.

5. The feed wagon auger mounting means of claim 1 wherein said supporting means comprises means for maintaining said shaft parallel to said bottom wall.

6. The feed wagon auger mounting means of claim 1 wherein said supporting means includes spring means for biasing said shaft toward a lowermost position at all times.

7. The feed wagon auger mounting means of claim 1 wherein said supporting means comprises guide means for constraining transaxial movement of said shaft solely vertically.

8. The feed wagon auger mounting means of claim 1 wherein said supporting means comprises a pair of support means carried by said opposite upright walls and means extending between said support means for causing substantially identical transaxial displacement of the shaft at each of said support means.

9. The feed wagon auger mounting means of claim 1 further including paddle means carried on said shaft for concurrently slicing and mixing the feed.

10. The feed wagon auger mounting means of claim 9 wherein said paddle means comprises movable spring biased means for disposing the paddle at different angular positions relative to the shaft axis.

11. In a feed wagon having a feed box having upright walls and a bottom wall cooperatively defining a feed holding space, and an auger extending across said space for moving feed through said space, said auger including a shaft and flighting on said shaft within said space, means for mixing the feed comprising:
   a paddle movably mounted on said shaft; and means for biasing said paddle to a preselected angular relationship to the axis of said shaft.

12. The feed wagon feed mixing means of claim 11 wherein said biasing means biases the paddle to a position parallel to the axis of the shaft.

13. The feed wagon feed mixing means of claim 11 wherein said biasing means comprises a spring having one portion fixed to said shaft and a second portion engaging said paddle.

14. The feed wagon feed mixing means of claim 11 wherein said paddle is arranged to have angular movement on said shaft of approximately 70°.

* * * * *